Dec. 25, 1956     C. HILL     2,775,307
FRONT WHEEL SUSPENSION FOR MOTOR VEHICLES
Filed Jan. 23, 1953     6 Sheets-Sheet 1
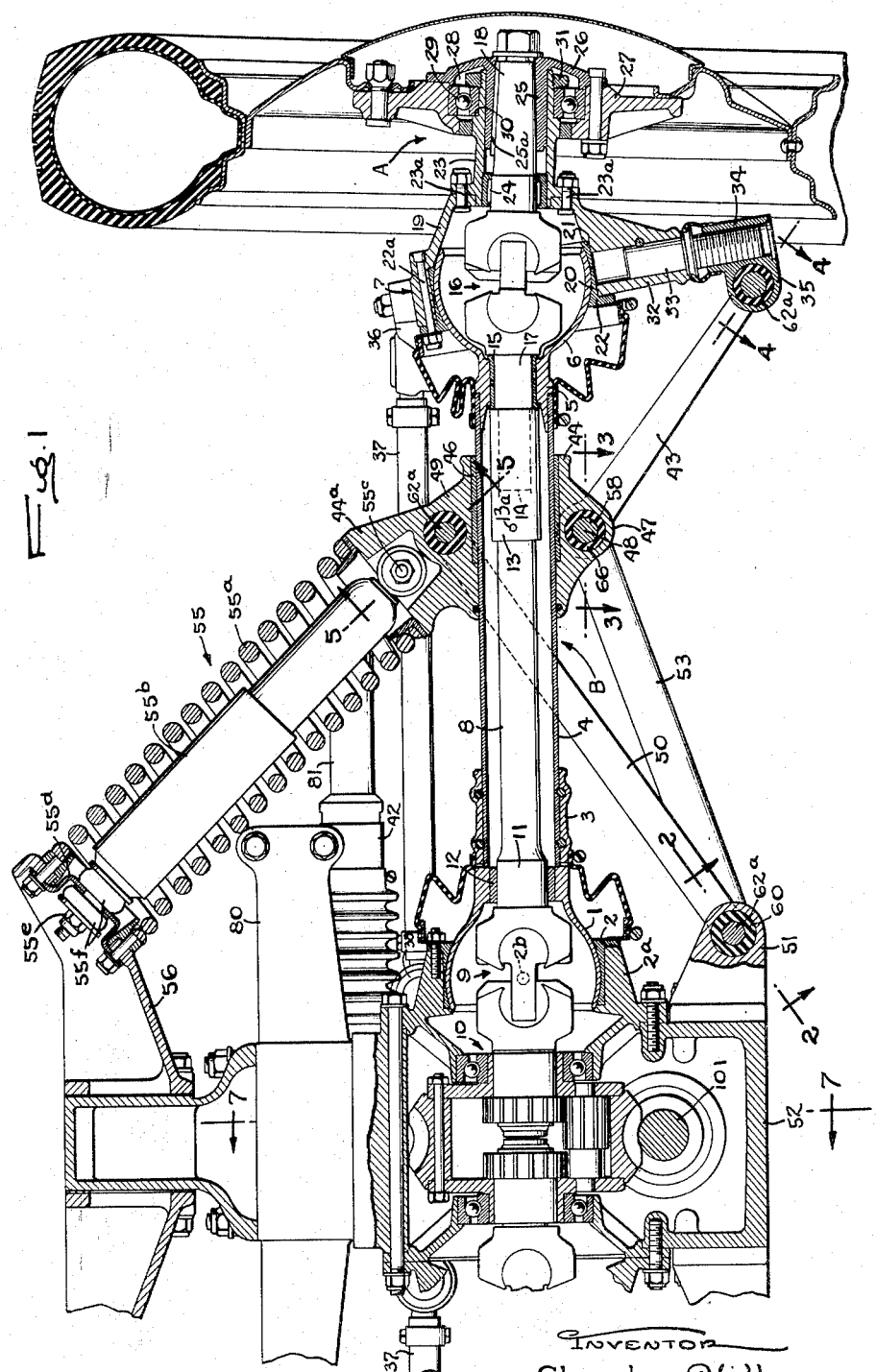
INVENTOR
Claude Hill
By Carlson, Pitzner, Hubbard & Wolfe
ATTORNEYS Dec. 25, 1956  C. HILL  2,775,307
FRONT WHEEL SUSPENSION FOR MOTOR VEHICLES
Filed Jan. 23, 1953  6 Sheets-Sheet 2
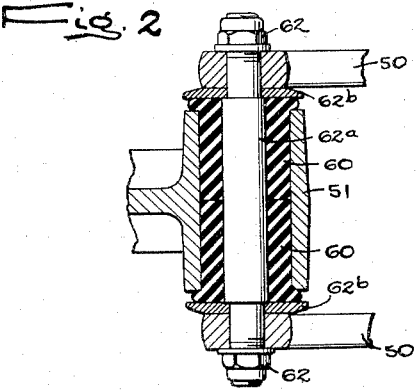
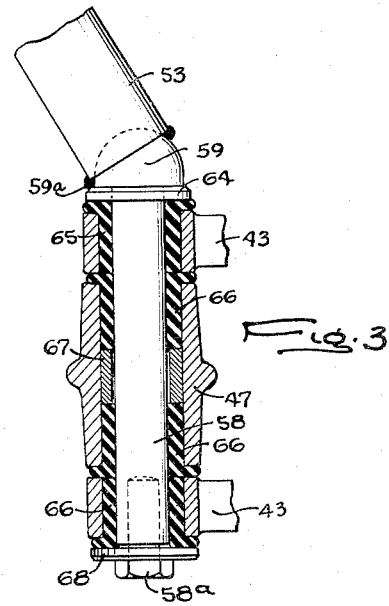
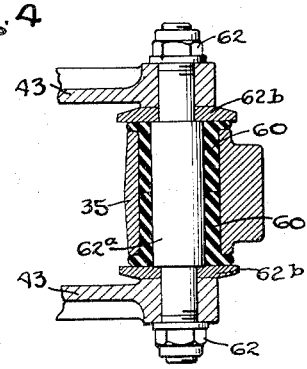
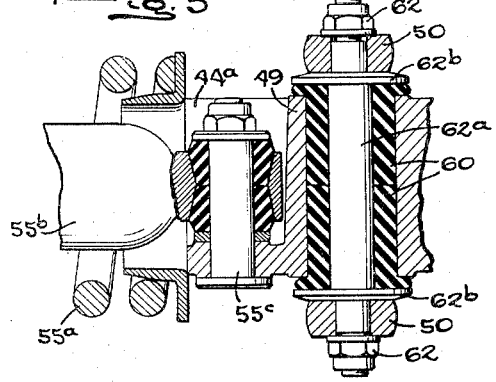

Dec. 25, 1956 C. HILL 2,775,307
FRONT WHEEL SUSPENSION FOR MOTOR VEHICLES
Filed Jan. 23, 1953 6 Sheets-Sheet 3

INVENTOR
Claude Hill
By Carlson, Pitzner, Hubbard & Wolfe
ATTORNEY

Dec. 25, 1956  C. HILL  2,775,307
FRONT WHEEL SUSPENSION FOR MOTOR VEHICLES
Filed Jan. 23, 1953  6 Sheets-Sheet 4
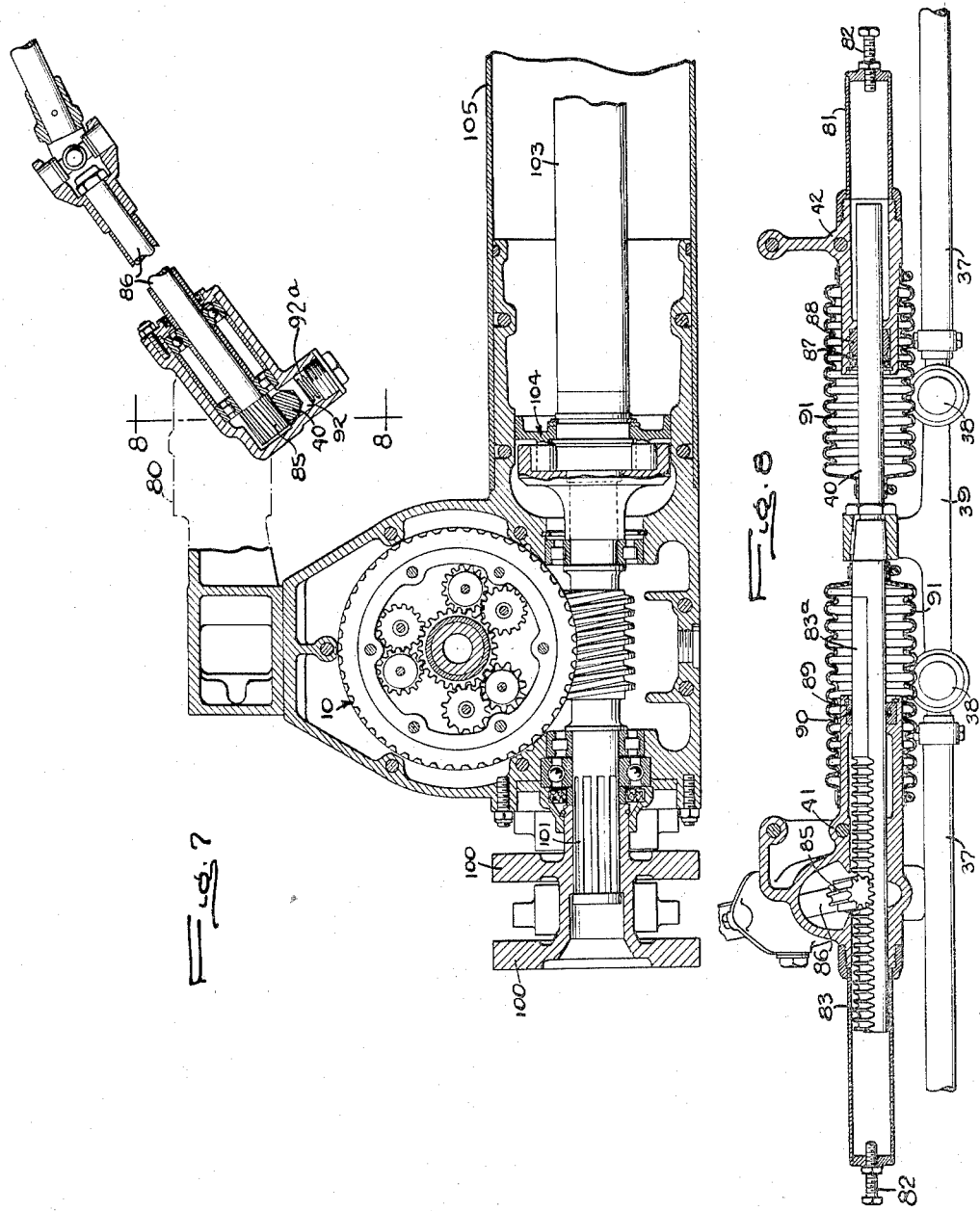
INVENTOR
Claude Hill
By Carlson, Pitzner, Hubbard & Wolfe
ATTORNEY Dec. 25, 1956 C. HILL 2,775,307
FRONT WHEEL SUSPENSION FOR MOTOR VEHICLES
Filed Jan. 23, 1953 6 Sheets-Sheet 5

INVENTOR
Claude Hill
By Carlson, Pitzner, Hubbard & Wolfe
ATTORNEYS

Dec. 25, 1956        C. HILL        2,775,307
FRONT WHEEL SUSPENSION FOR MOTOR VEHICLES
Filed Jan. 23, 1953        6 Sheets-Sheet 6
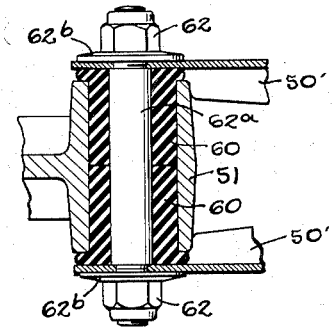
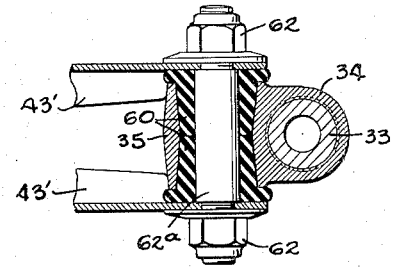
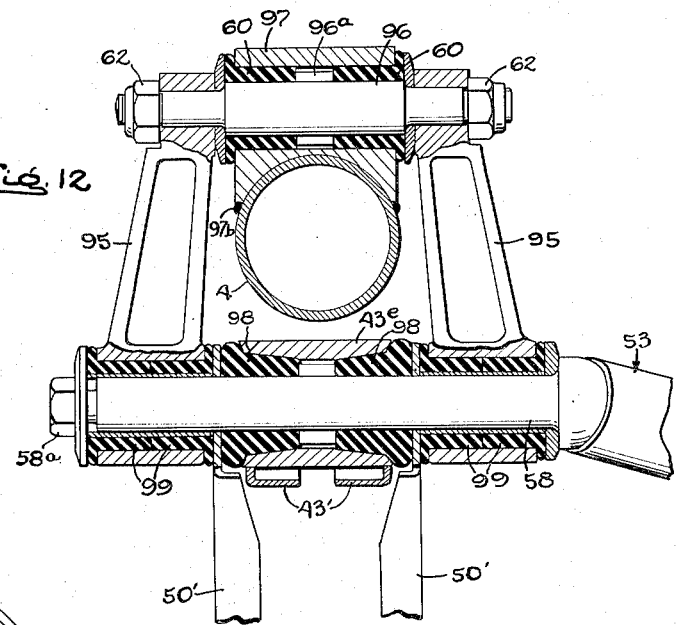
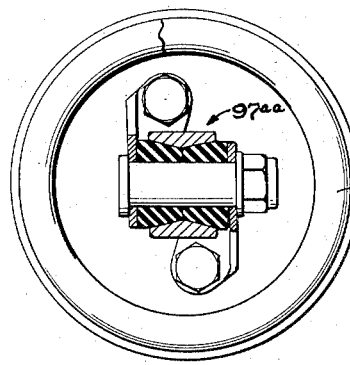
INVENTOR
Claude Hill
By Carlson, Pitzner, Hubbard & Wolfe
ATTORNEYS

United States Patent Office 2,775,307
Patented Dec. 25, 1956

2,775,307

FRONT WHEEL SUSPENSION FOR MOTOR VEHICLES

Claude Hill, Kenilworth, England, assignor to Harry Ferguson Research Limited, Coventry, England, a British company Application January 23, 1953, Serial No. 332,793

Claims priority, application Great Britain January 25, 1952

11 Claims. (Cl. 180—43)

The present invention is concerned with front wheel suspensions and axle arrangements for motor vehicles. It is particularly concerned with those vehicles in which the front wheels are employed as driving or traction wheels as well as for steering as, for example, in either four wheel drive vehicles or in front wheel drive vehicles.

In such a situation the multiple demands on the front wheels impose a variety of difficulties. Individual suspension of the front wheels to accommodate road bumps while still retaining a drive connection to each wheel means that the drive to each wheel must be taken through an axle which is individually articulated for up and down swing. Such an arrangement is shown, for example, in U. S. Patent No. 2,105,781 to Dixon. Steering introduces the further complication that provision must also be made for turning the wheels laterally. In the Dixon patent noted, that was accomplished by fore and aft swing of the half axles themselves. Such an arrangement introduces other difficulties, however, it being preferable to use a so-called Ackerman type of steering in which the wheels are turned relative to the axle rather than depending upon a bodily swing of the axle itself for steering. But such turning of the wheels requires still another joint in the line of drive to the wheels so that two joints are required for each wheel.

With a doubly jointed axle construction introduced for each front wheel not only do problems of stability and load transmission appear but in addition the problem of overcoming lateral tire scrub and interfering gyroscopic effects is present. That is to say, that if the road wheel appears coaxial with the individual half axle, as the latter rises and falls, the wheel will cant sideways scrubbing the tire crosswise of the road and wearing it excessively. Likewise alteration in the plane of the wheel by its canting introduces gyroscopic forces. These are particularly undesirable in a steered wheel.

The general aim of the present invention has been to provide a suspension and axle arrangement for a steered, front traction wheel of a vehicle which embodies a novel, simplified and effectual arrangement for obviating lateral tire scrub and gyroscopic interference.

Coordinate with that aim, it has been the object to minimize the unsprung weight in the construction and otherwise to insure uniform ground contact for the traction wheels, along with good stability and steerability of the vehicle in even the most difficult terrain.

In accomplishing such objectives, an arrangement has been devised in which an articulated linkage extends between the vehicle chassis and a stub axle assembly freely swiveled on the end of the vertically swingable half axle. The arrangement is such that extension and collapse, or "jackknifing" of that linkage rocks the road wheel laterally. In order that such rocking may be made to compensate or correct wheel position to minimize lateral tire scrub and gyroscopic interference, the linkage is arranged to be actuated directly from the half axle assembly itself and in response to rise or fall of the latter from a mean position.

Other objects and advantages of the invention will become apparent as the following description proceeds, taken in connection with the accompanying drawings, in which:

Figure 1 is a front sectional view of a front wheel suspension and axle arrangement embodying the present invention;

Figs. 2, 3, 4 and 5 are detailed cross-sectional views taken respectively substantially along the lines 2—2, 3—3, 4—4, and 5—5 of Fig. 1;

Fig. 7 is a fragmentary sectional view taken substantially along the line 7—7 in Fig. 1;

Fig. 8 is a fragmentary sectional view taken substantially along the line 8—8 in Fig. 7;

Figure 9:
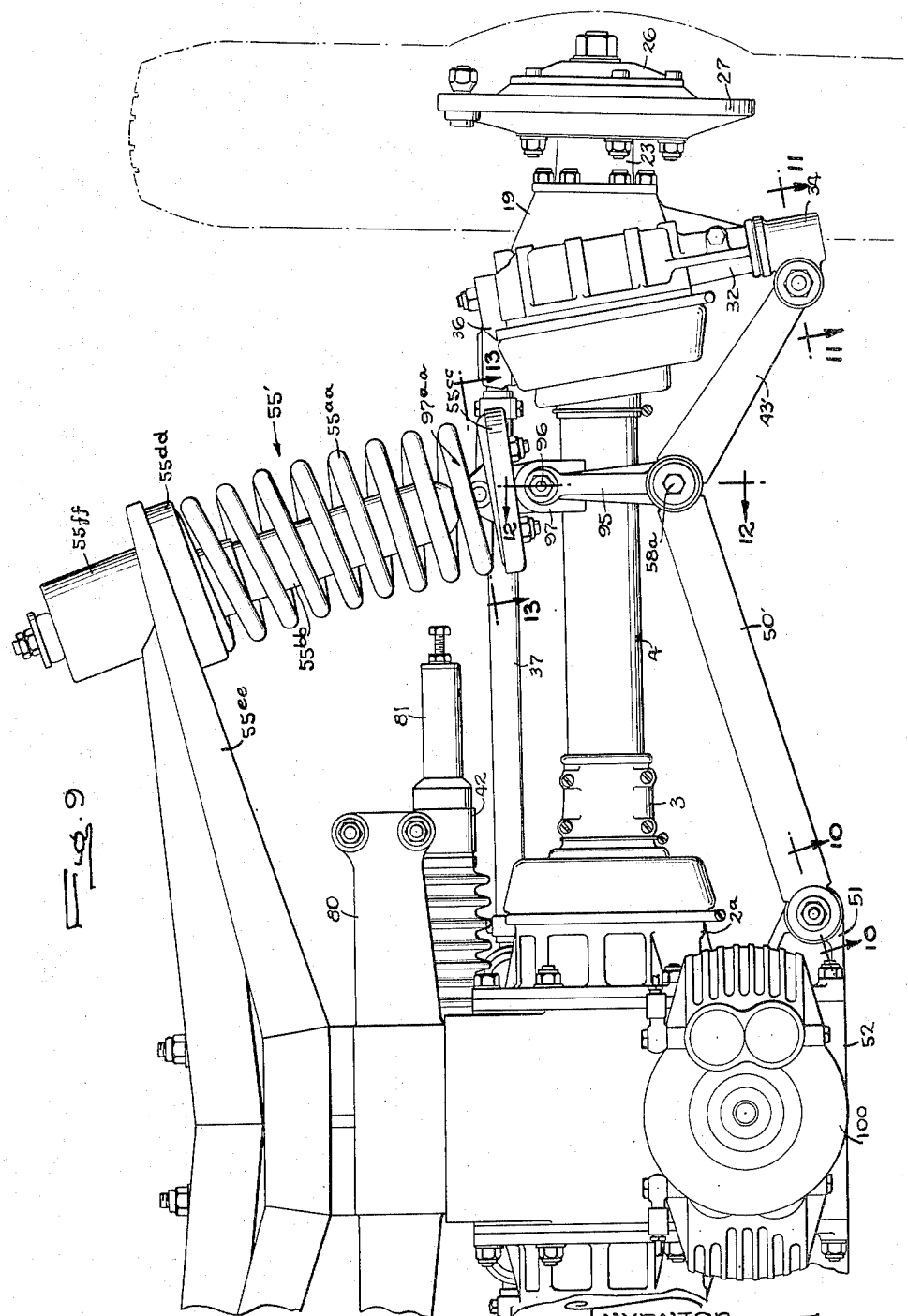
Fig. 9 is a front elevational view similar to Fig. 1 but showing a modified construction also embodying the present invention.

Figs. 10, 11, 12 and 13 are detailed cross-sectional views taken respectively substantially along the lines 10—10, 11—11, 12—12, and 13—13 in Fig. 9.

Although certain particular embodiments of the invention have been shown and described in some detail there is no intention to thereby limit the invention to precisely such embodiments. On the contrary, the intention is to cover all modifications, alternative constructions and equivalents falling within the spirit and scope of the invention as defined in the appended claims.

Turning now to the first embodiment here shown (see Fig. 1), the invention has been exemplified as incorporated in the front wheel suspension and drive mechanism of a vehicle intended to have a pair of front wheels, both of which serve for steering and traction. Since the assemblies for each of the two front wheels are the same, description of the mechanism for one wheel will suffice for both. The wheel shown is carried by a stub shaft assembly A freely swiveled on the outer end of a vertically swingable half axle assembly B. The latter assembly is shown as including a semi-spherical casing 1 universally mounted in a complementary socket 2 in a front differential gear casing side plate 2a and having a hollow projection 3 in which an outer axle tube 4 is detachably secured. At its outer end the tube 4 is welded over a hollow cylindrical projection 5 on a similar semi-spherical casing 6 which forms the inner member of a hollow universal joint. The outer member 7 of the latter universal joint forms part of the assembly A carrying an outer stub axle for the wheel. Dowel pins 2b may be provided between the differential socket 2 and the corresponding casing 1 to restrain rotation of the latter and the outer housing 4 about the axis of the latter.

The driving shaft means consists of an inner shaft 8 which has a constant velocity type universal connection 9 at its inner end (within the inner spherical casing) with a differential gear 10. An enlarged collar 11 fast on the shaft 8 is journaled in a bearing sleeve 12 interposed between it and the hollow projection 3 of the semi-spherical casing 1. The outer end of the shaft 8 is reduced and splined to fit drivingly into a coupling sleeve 13 which also overlaps a similarly splined and reduced end 14 of an outer shaft 17 journaled in bearing sleeve means 15 in the hollow projection 5 of the outer semi-spherical casing 6. The latter casing contains a constant velocity type universal joint 16 connecting the shaft 17 with a "live" stub axle 18. The splined sleeve 13 is held fast on the shaft 8 by a pin 13a. While the outer shaft 17 may have some freedom to shift axially within the sleeve 13, such shifting will not occur in appreciable magnitudes.

The assembly A carrying the outer stub axle comprises a substantially annular casing 19 having an internal annular recess 20 adapted to receive a bearing ring 21. Such ring presents a partially spherical surface adapted to bear on the semi-spherical casing 6 when the annular casing 19 is fitted over the open end of the semi-spherical casing. The universal connection between the annular and semi-spherical casing is completed by a flanged ring closure member 22 which is secured by bolts 22a to the annular casing and includes a partially spherical bearing surface for engaging the semi-spherical casing 6. Thus the semi-spherical casing 6 at the outer end of the hollow outer axle assembly and the annular casing 19 form what amounts to a hollow universal joint and within which is concentrically located the universal driving joint 16 between the "live" axle 8, 17 and the "live" stub axle 18.

An outer or hollow stub axle 23 is provided, being flanged at its inner end and secured by bolts 23a to said flange to the outer end of the annular casing 19. The live stub axle 18 is borne near the inner end by a needle roller bearing 24 between it and the outer stub axle 23. Such inner stub axle 18 is tapered at its outer end to receive a sleeve 25 which is keyed on it as at 25a and has a driving flange 26 to which is bolted a wheel hub 27. The flange and the hub are shaped to constitute an annular recess 28 in which is located a ball bearing 29 mounted on the outer stub axle 23 and carrying the hub 27, the bearing being held against a shoulder 30 on the outer stub axle by means of a ring nut 31 on the end of such axle 23.

The arrangement described so far constitutes a medially and universally jointed axle assembly formed of an inboard portion or half axle assembly B, and an outboard portion or stub axle assembly A. The result is a three quarter floating axle which is wholly enclosed so that all the bearings from the inner end right out to the hub may be lubricated from the differential without the need for grease points, such, for example, as the usual kingpin grease nipple. The bearing arrangement of the hub is simple and robust, the relatively large diameter hollow stub axle 23 enabling the use of a large ball bearing which bears the bulk of the radial load, and the needle bearing serving as a steady bearing for the wheel and obviating the need for another bearing on the outer stub axle 23 for this purpose.

Formed integrally with the annular joint casing 19 is a downwardly and slightly outwardly inclined cylindrical part 32 of substantial length in which is fixed, for example, by welding not shown, the inner end of a pin 33. The outer end of this pin is threaded and carries a nut 34 having an eye 35 thereon for pivotal connection to linkage to be described later. Meantime it is sufficient to note that the pivotal connection is horizontal and that the linkage restrains the nut from movement other than that in a vertical plane transverse to the fore and aft axis of the vehicle. The nut 34 and threaded pin 33, in conjunction with the outer universal joint 6, 19 of the outer axle, serve to constitute the kingpin axis about which steering movement takes place, the axis being generally upright but preferably slightly inclined to the vertical to meet the ground at or near the ground contact point of the tire. Such axis may also be inclined fore and aft to give a castor action. In effect, the nut 34 serves to limit the universal action of the universal joint 6, 19 by confining its motion to turning about a fore and aft axis (during up and down springing movement) and to steering action about the kingpin axis. During steering movement there will be a slight up and down relative movement between the nut 34 and threaded pin 33 but this is too slight to affect appreciably the geometry of the system. Consequently the pin and nut can be used to form a simple combined bearing for rotation during steering action and a lower anchor for the kingpin axis. The threaded pin 34 for one steered wheel is oppositely threaded to that of the other steered wheel.

The steering action may be imparted by any suitable mechanism. That here shown (see particularly Fig. 6) consists of a steering arm 36 attached to the top of the aforesaid annular casing 19 and universally connected at the other end to a transverse tie rod 37. The inner end of the tie rod is universally connected at 38 to a transversely located link 39. This link is attached at each of its ends to the tie rods 37 for the respective wheels and is attached (see Fig. 8) to a transverse relay rod 40. The latter is guided in laterally spaced casings 41 and 42 attached to bracket arms 80 fixed on top of the differential casing. Each of the casings 41, 42 is closed by a corresponding extension tube 81 to accommodate endwise movement of the relay rod. Adjustable stop screws 82 are provided at the outer ends of the tubes. At one end the rod 41 is formed as a rack 83 with a corresponding flat 83. The rack 83 is engaged by a pinion 85 on a steering column shaft 86.

The enclosed casings form oil baths for the mechanism and thus oil seals are required. A right-hand seal 87 (Fig. 8) and spherical bearing member 88 offer no difficulty as they cooperate with a portion of the rod 40 of round cross-section, but it is otherwise with the seal in the left-hand casing. It has to provide a seal despite the passage through it of the rack 83. The problem is solved in this instance by the provision of the flat 83a which is coplanar with the tips of the rack teeth and by providing a bearing ring 89 which is of complementary substantially D-shaped cross-section and contains a rubber sealing ring 90. Thus an effective oil seal is provided and any oil which may be carried out between the rack teeth is retained by a bellows 91. To maintain the rack teeth in close engagement with the pinion 85, the rack is backed up by a compression spring 92a engaging a bearing 92 located opposite the pinion (see Fig. 7).

Figure 6:
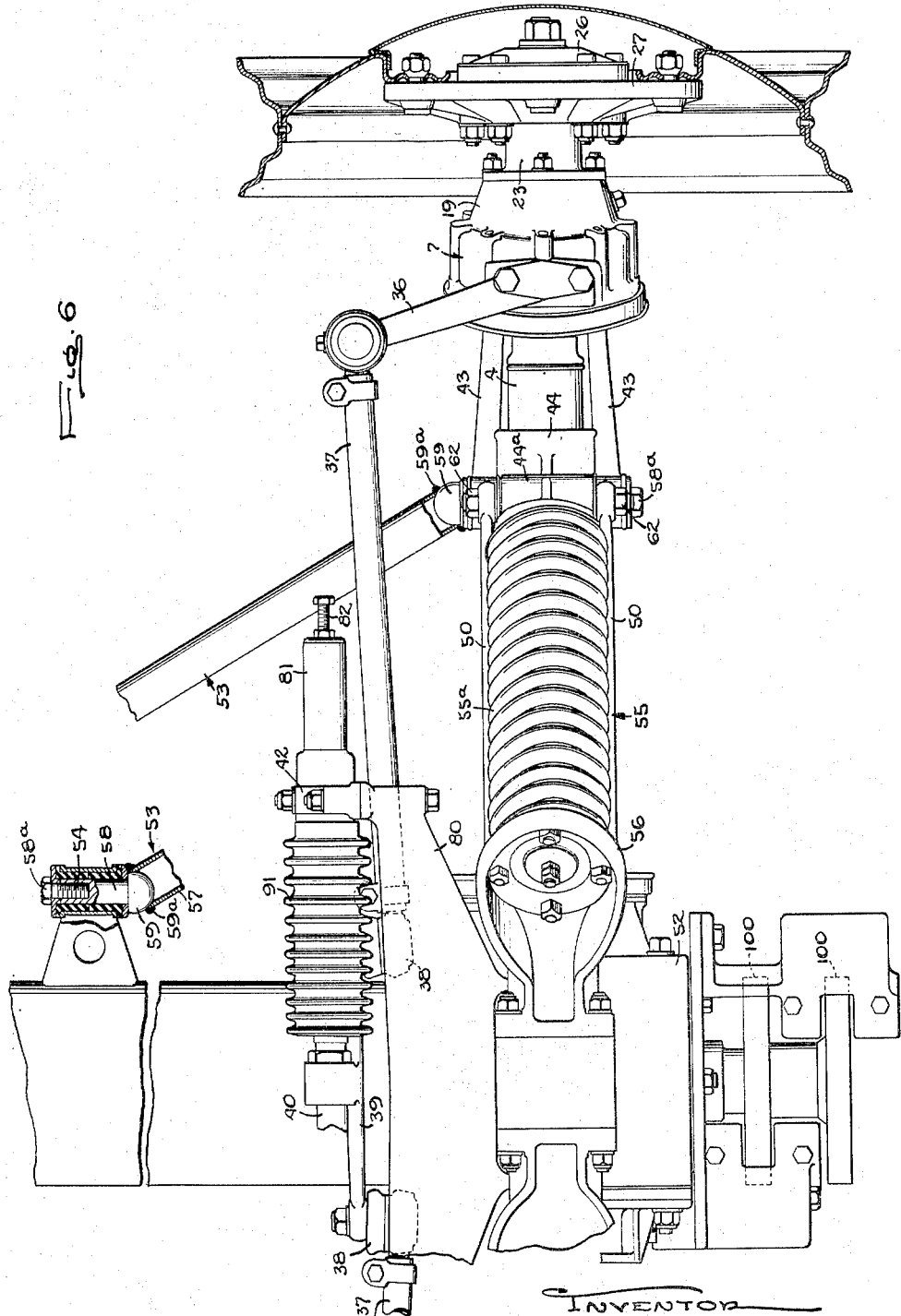
Fig. 6 is a plan view of the mechanism shown in Fig. 1.

The linkage means for governing the up and down or springing movement of the half axle assembly comprises duplex links 43 pivoted about a fore and aft axis, as aforementioned, to the nut 34 (Figs. 1 and 6). The links 43 extend upwardly and inwardly to a support member which, in this instance, is a sliding or floating guide member 44 on the outer tube of the axle unit. This guide is a circular or sleeve-like member and has within it a ring 46 of anti-friction material, for example, of graphite-impregnated plastic, to give a bearing which does not require lubrication and which allows relative sliding movement between the tube 4 and guide member 44. On the lower part of the guide member there is an elongated boss 47 with which the duplex links 43 above mentioned, have pivotal connection about a fore and aft axis at 48. On the upper part of the guide member 44 there is a second boss 49 and with which the upper ends of duplex radius rods 50 have pivotal connection, also about a fore and aft axis. These rods 50 straddle the axle and extend inwardly and downwardly for pivotal connection about a fore and aft axis with a bracket 51 at the foot of the side wall 2a of the differential casing 52. This axis is just slightly above the level of the pivotal connection of the lower ends of the duplex links 43 with the nut 34, and the pivotal axes of the connections of the radius rods 50, and of the duplex links 43, each with the guide 44 are in vertical alignment. The linkage controlling the suspension movement is completed (Fig. 6) by a bracing rod 53 having cranked ends, the forward end having pivotal connection with the lower part of the guide member 44 coincident with the pivotal connection of the duplex link 43 and the rear end having pivotal connection 54 about a fore and aft axis with the vehicle's chassis, said axis being in fore and aft alignment with the pivotal axis of the radius rods 50 with the bracket 51.

Spring means for the illustrated half axle assembly consists in the present instance of a spring and damper strut assembly 55 pivotally connected to the top of the guide member 44 adjacent the fore and aft pivotal axis of the radius rods 50 and extending upwardly and inwardly for connection to a bracket 56 on top of the differential casing. The spring assembly includes a helical spring 55a located between an upward and inward boss extension 44a and the bracket 56. A hydraulic damper 55b of any suitable construction is pivoted at 55c in the hollow extension 44a and is resiliently connected at its upper end to a dished ring 55d through the intermediary of a clamping nut 55e and resilient discs 55f.

During springing movement, for example, upward movement on a road bump, the axle assembly swings upwardly about the universal connection 1, 2 with the differential casing 52. If the wheel remained at right angles to the axle the point of ground contact would move outwardly and increase the track width, causing lateral tire "scrub" and wear. Moreover, such movement would introduce gyroscopic forces which would seriously affect the steering. In the present arrangement, however, the radius rods 50, turning about a different center from the universal joint 1, 2 (i. e. about a center on the bracket 51 at the foot of the differential) and about a shorter radius than the wheel, cause the guide sleeve 44 to slide slightly inwards on the axle tube 4. And this movement is transmitted by the duplex or secondary links 43 to the nut 34, that is, to the lower end of the kingpin axis. Thus the stub axle assembly and the wheel are given an angular movement about the outer universal joint 6 opposite to the upward movement of the axle. The geometry of the pivots, that is to say the inner and outer universal joints and of the pivots at the ends of the links 43 and 50, is such that, in effect, the ground contact point for the tire moves in a vertical or substantially vertical line. Consequently, lateral wheel scrub is obviated or is so slight as to be negligible. Since the wheel continues to revolve in a parallel or substantially parallel plane there is little or no gyroscopic effect.

If the pivots, that is, at the inner and outer ends of the links 43 and 50, are so spaced as to cause the ground contact point to move more or less truly vertical then there will, on bump or upward movement, be a certain amount of inward tilting movement of the wheel with corresponding gyroscopic forces. On the other hand, if the pivots are so spaced that the wheel executes a truly parallel upward movement then there will be a certain amount of inward wheel scrub upon bump or upward movement. Either of these pivot spacings can be adopted or a compromise between the two. For example, in one compromise spacing which is here shown the tilting of the wheel amounts to only about 1° and the scrub is about $\frac{1}{16}$" on full bump of 4".

On rebound, that is upon axle swing below the normal static load position the radius rods 50 push the guide sleeve 44 outward and the wheel is again angularly swung oppositely to the axle to obviate wheel scrub and tilting or angular movement. Thus the radius rods 50, the guide member 44 and the duplex links 43 constitute a compensating link means to modify the effect on the wheel of the purely arcuate swing of the main half axle assembly itself.

In the arrangement shown the axle casing itself forms a part of the linkage controlling the wheel motion and thus there is a simplification as compared with the orthodox wishbone independent driven wheel suspensions wherein the axle unit is additional to the upper and lower wishbone.

The inner ends of the radius rods 50 and the bracing rod 53 swing about the same fore and aft axis but their respective outer ends are connected at vertically spaced points to the guide or floating member 44. Consequently there is a slight misalignment but this is readily allowed for by the use of resilient bushes in the pivots.

Fore and aft forces on the half axle due to braking or acceleration are taken by a generally diagonal bracing rod 53. The front connection of this rod is below the center of the axle, that is, below the plane of rearward thrust from the wheels on braking but the distance is relatively small so that the consequent twisting or rotational effort induced in the floating guide 44, as for example, on braking, is relatively slight and easily resisted by the spaced radius rods 50 and by the substantially long bearing or pivot pin 58 at the front end of the bracing rod 53. It will be convenient to note at this point a further advantage over the orthodox wishbone construction. With individual orthodox wheel brakes there is a substantial tendency on braking for the kingpin axis to rotate around the wheel axis. Consequently to resist this, there is the need for the upper and lower wishbones having inner connections to the chassis and which are well spaced fore and aft. In contrast, the use of transmission braking or inboard individual brakes on each half axle, obviates this rotational effect on the kingpin axis and enables a lighter and simpler assembly which also can be disposed, with the exception of the single bracing rod 53, in one transverse plane. Thus it is also more compact. And while the outer member 7 of the outboard ball and socket joint is freely swiveled on the inner casing 6, it is prevented from rotating with the stub axle 18 by the duplex links 43. Therefore, the combination of inboard brake means, such as the brake shown in Fig. 7, with a suspension of the type described is particularly advantageous, the duplex links 50 and 43 serving not only to cant the wheel upon vertical swing of the axle, but also to prevent rotation of the freely swiveled ball joint member about the axis of the axle.

As indicated in Fig. 7 a disc type brake 100 may be mounted on a front transmission shaft 101 which drives a front differential gear 10 and which receives the drive from the engine-driven rear shaft 103 through a two-way free wheel device 104. The chassis is indicated here as comprising a tubular, longitudinal member 105 (Fig. 7) of the general form employed in the Dixon patent identified above.

In one convenient method of construction of the brace rod 53 (Fig. 6) the main or intermediate part consists of a tubular member 57. The end parts, that is, the pivot pins 58, consist of pins having semi-spherical ends 59. These ends are socketed in the ends of the tube and welded thereto, as at 59a with the pin at the desired angle, the pins being parallel to each other. The pin and head may be drilled out (Fig. 3) to lighten the construction and to reduce the amount of welding heat and so reduce the risk of overheating the tube.

In all of the pivotal connections, that is, the pivotal connections of the radius rods 50, the duplex links 43 and the bracing rod 53, there are preferably interposed rubber or the like elastically deformable bushings of known type and which in fitting are axially compressed to grip the internal pivot pin and the boss. The pivoting action, which involves only relatively small angular movement, is allowed by deformation of the rubber or the like elastic bushing. Such joints do not require lubrication and will allow slight relative angular movement between the longitudinal axes of the pin and boss. In the pivotal connection of the radius rods 50 to the differential casing bracket 51 (Fig. 2) and to the upper part of the sliding guide 44 (Fig. 5), as well as in the pivotal connection of the duplex links 43 to the nut member 34 (Fig. 4), two flanged elastic bushings 60 are oppositely inserted into the boss member of the pivot and are axially compressed by attaching nuts 62 engaged on the threaded ends of pivot pins 62a. Washers 62b are pressed against shoulders on the pins. In the case of the brace rod 53 (Fig. 3 and Fig. 6) the compression of the bushings is secured by means of threaded studs 58a engaging in hollow pins 58. This compression not only fixes the bushings in the manner described but also causes the flanges to swell out between the ends of the boss and a washer or the like which may be employed.

The pivotal connection at the bottom part of the sliding or floating guide member 44 (Fig. 3), is a common pivot for the inner end of the duplex links 43 and for the front end of the brace rod 53. It includes a novel assembly or pack of elastic bushings. The pin 58 on the end of the brace rod 53 forms a common pivot pin and on it are first threaded a washer 64, an elastic bushing 65 and one of the links 43 which fits over the bushing, and then three other elastic bushings 66, a metal distance piece 67 being interposed between the second and third bushings. The pin and assembly described are then inserted into the boss 47 on the guide member, the last bushing extending out through the other end of the boss. The other link 43 is then mounted on the last bushing, then a washer 68 and finally the whole pack is axially compressed by the attaching nut 58a screwed on to the end of the pin. In this compressing process the first and last elastic bushings form flanges between the washers and links 43, while the second and second last elastic bushings form flanges between the ends of the boss 47 and the inner faces of the links 43, the distance piece 67 being located entirely within and centrally of the boss 47 and having small radial clearance so as not to impede the freedom of movement allowed by the elastic bushings. In this fashion the common pivot for the three parts, that is, the sliding guide 44, the duplex links 43 and the bracing rod 53 is simply formed and quickly assembled.

In Figs. 9 to 12 there is shown a modified arrangement embodying the invention and which on the basis of present study constitutes the preferred form of the invention. This modified arrangement is, in general, substantially like that already described except that the sliding guide 44 is replaced by a shackle arrangement. The same reference numerals are employed to identify identic parts.

In place of the sliding guide 44 there are provided two depending links or shackles 95 pivoted on a transverse pin 96 which is attached in a bracket 97 fixed, as by welding at 97b, on the axle casing tube 4. As shown in Fig. 12, the pin 96 is attached by a rubber bushing assembly similar to that in Fig. 5 except that there is interposed between the rubber bushings a metal spacer ring 96a having slight radial clearance to allow the bushings to flex sufficiently to permit a slight angular movement between the pin 96 and bracket 97 and also to allow the bushings to exert full cushioning effect. At their lower ends the shackle links 95 are pivoted to the duplex links 43' and to the radius links 50'. It will be noted that links 50' and 43' differ from links 50 and 43 in Fig. 1 in that they are of channel section and that the links 43' have a common boss 43e at the top.

The resilient bushing assembly of Fig. 12 consists of the pin 58 of the bracing rod 53 on which is mounted the boss 43e of the duplex links 43' by means of rubber bushings 98 and on which is pivoted the radius links 50' and to which the shackle links 95 are pivoted by the rubber bushings 99, the whole assembly being axially compacted between the outside washers by the stud 58a substantially as in the manner shown in Fig. 2.

The pivotal connection of the radius rods 50' to the bracket 51 is shown in Fig. 10 and is substantially the same as that in Fig. 2. Likewise the pivotal connection of the links 43' to the nut 34 is shown in Fig. 11 and is substantially the same as shown in Fig. 4.

It will be perceived upon close study that the operation of the linkage of Fig. 9 is substantially the same as that of Fig. 1 except in two respects. The first is that, due to the introduction of the shackle links 95, the pivot point between the radius links 50' and duplex links 43' executes an arcuate motion with respect to the axle tube 4 instead of a straight line motion, but this does not exert any substantial effect on the path followed by the tire contact zone with the ground. That is, as the shackle links 95 swing through relatively small angles from their illustrated positions, the pivot connection at 58a moves primarily parallel to the half axle and only insignificantly toward or away from such half axle. The second is that the slope of the radius links 50' is less (than that of the links 50) and this causes a slight lowering of the roll center. For example, in one particular installation it was found that the roll center, with the arrangement of Fig. 1, was about ⅝″ above ground level, and it was about ⅜″ below said level with the arrangement of Fig. 9.

From a mechanical and structural point of view, the shackle arrangement is preferred to the sliding guide in that it is structurally simpler and avoids the friction of the sliding engagement entailed in the use of the sleeve 44.

A suspension spring and strut assembly 55' (Fig. 9) may be arranged substantially as in Fig. 1. More specifically a spring 55aa engages at the bottom in a cup 55cc attached to the bracket 97 and at its upper end is received in a similar cup 55dd attached to a chassis bracket 55ee. A damper 55bb has pivotal attachment, by means of the resilient bushing assembly 97aa (Fig. 13) at its lower end with the bracket 97. It will be noted that the bracket 55ee in Fig. 9 is substantially longer than the bracket 56 in Fig. 1, and thus the spring can be arranged more nearly vertical and is substantially shorter. Thus, the damper, which is of the same length as in Fig. 1, projects up beyond the top of the spring and is attached at its top end to the top end of an inverted cup member 55ff which is secured to the chassis bracket 55ee.

I claim:

1. In a suspension and drive mechanism for an individually suspended, steerable, front traction wheel of a vehicle, the combination of a vertically swingable half axle assembly having means for restraining the same against fore and aft swing and including a non-rotatable housing with a live axle journalled in its interior, a stub axle assembly having a road wheel thereon and universally jointed to the outer end of said half axle assembly to swing fore and aft with reference to the latter for steering purposes and also to rock vertically with reference to said half axle assembly, said stub axle assembly including a non-rotatable housing having a live stub axle therein universally jointed to the first-mentioned live axle, first and second links pivotally jointed together in generally end-to-end relation, means pivotally connecting the outer ends of said links respectively to a fixed point on the vehicle and to said stub shaft housing and at points vertically displaced from respective ends of said half axle assembly on a common side thereof, and means including an axially slidable sleeve carried by said half axle housing and on which the joint between said links is pivoted for confining such joint to motion in a path substantially paralleling the longitudinal axis of said half axle assembly in the course of the articulation of said links incident to vertical swing of said half axle assembly.

2. In a suspension and axle arrangement for an individually suspended, steerable, front traction wheel of a vehicle, the combination of a medially and universally jointed axle assembly having a pivot joint at the inboard end of said axle assembly connecting the same to the vehicle for vertical swinging movement, said wheel being carried on the outboard portion of said axle assembly a medially and pivotally jointed linkage having its extremities pivotally connected respectively to the vehicle and said outboard portion, and means connecting the joint of said linkage to the inboard portion of said axle assembly with freedom of such joint to shift substantially axially along the half axle assembly, to thereby compensatingly cant said ground wheel relative to the inboard portion of said axle assembly as an incident to vertical swing of the latter.

3. In a suspension and axle arrangement for an individually suspended, steerable, front traction wheel of a vehicle, the combination of a half axle assembly, means mounting said half axle assembly on a vehicle for relative vertical swinging movement to accommodate passage of the vehicle over uneven ground, means interconnecting the vehicle and said half axle assembly for restraining the latter against fore and aft swing relative to the vehicle, a stub axle assembly mounting said wheel and means freely swiveling said stub axle assembly on the outboard end of said half axle assembly, a pair of links disposed in a generally flattened inverted V relation and extending beneath said half axle assembly from end-to-end thereof, means pivotally connecting about fore and aft axes the remote ends of said links respectively to an anchorage point on the vehicle and to said stub axle assembly, a member carried intermediate the ends of said half axle assembly and having means for permitting at least a portion of said member to move in a direction substantially parallel to the axis of said half axle assembly, and fore and aft extending pivot means connecting the adjacent ends of said links to said portion of said member, so that upon vertical swinging movement of the half axle assembly the links jackknife relative to one another to compensatingly cant said stub axle assembly and wheel relative to the half axle assembly.

4. In a suspension and axle arrangement for an individually suspended, steerable, front traction wheel of a vehicle, the combination of a half axle assembly, means mounting said half axle assembly on a vehicle for vertical swinging movement to accommodate passage of the vehicle over uneven ground, means interconnecting the vehicle and said half axle assembly for restraining the latter against fore and aft swing relative to the vehicle, a stub axle assembly mounting said wheel, ball and universal joint means mounting said stub axle assembly in freely swiveled relation on the outboard end of said half axle assembly, means for rocking said stub axle assembly fore and aft for steering purposes about a generally upright steering axis, a pivotally jointed tandem linkage adapted to have jackknife motion, means for pivotally connecting one end of said linkage to an anchorage point on the vehicle and pivotally connecting the other end of said linkage to said stub axle assembly at a point displaced vertically from the center of swiveling of said stub axle assembly, a member and means mounting it on said half axle assembly so that at least a portion thereof has freedom to shift substantially longitudinally of said half axle assembly, and means pivotally connecting the center joint of said linkage to said portion of said member so that said linkage jackknifes in accordance with rise or fall of said half axle assembly from a mean position therefor and thereby compensatingly cants said wheel to reduce lateral scrub.

5. In a suspension and drive mechanism for an individually suspended, steerable, front traction wheel of a vehicle, the combination of a vertically swingable half axle assembly having means for restraining the same against fore and aft swing and including a non-rotatable housing with a live axle journalled in its interior, a stub axle assembly having said wheel thereon and universally jointed to the outer end of said half axle assembly to have freedom to swing fore and aft with reference to the latter for steering purposes and also to rock vertically with reference to said half axle assembly, said stub axle assembly including a non-rotatable housing having a live stub axle therein universally jointed to the first-mentioned live axle, first and second links disposed in generally end-to-end relation, means pivotally connecting the outer, remote ends of said links respectively to a fixed point on the vehicle and to a point on said stub axle housing, said points being vertically displaced from respective ends of said half axle assembly on a common side thereof, and means carried by said half axle housing pivotally joining the adjacent ends of said links and confining such ends to motion in a path substantially paralleling the longitudinal axis of said half axle assembly in the course of articulation of said links incident to vertical swing of said half axle assembly.

6. In a suspension and axle arrangement for an individually suspended, steerable, front traction wheel of a vehicle, the combination of a half axle assembly, means mounting said half axle assembly on a vehicle for vertical swinging movement to accommodate passage of the vehicle over uneven ground, means interconnected between the vehicle and said half axle assembly for restraining the latter against fore and aft swing relative to the vehicle while permitting said vertical swinging movement, a stub axle assembly mounting said wheel, means swivelably mounting said stub axle assembly on the outboard end of said half axle assembly, a pair of links pivotally jointed together at adjacent ends for jackknifing toward and from each other and arranged to extend along said half axle assembly, means pivotally connecting the remote ends of said links respectively to said stub axle assembly and to an anchorage point on the vehicle, and means including a member pivotally attached to said half axle assembly at a point intermediate its ends and pivotally connected to the jointed ends of said links for confining the joint between said links to movement in a path substantially paralleling the longitudinal axis of said half axle assembly and at a substantially uniform distance therefrom throughout any vertical swing of said half axle assembly.

7. In a suspension and axle arrangement for an individually suspended, steerable, front traction wheel of a vehicle, the combination of a half axle assembly, means mounting said half axle assembly on a vehicle for vertical swinging movement to accommodate passage of the vehicle over uneven ground, means interconnected between the vehicle and said half axle assembly for restraining the latter against fore and aft swinging relative to the vehicle while permitting said vertical swinging movement, a stub axle assembly mounting said wheel, means swivelably mounting said stub axle assembly on the outboard end of said half axle assembly, a pair of links disposed in end-to-end relation and extending along said half axle assembly, means pivoting the outer end of one link to a point on the vehicle and pivoting the outer end of the other to said stub axle housing, a support member on and intermediate the ends of said half axle assembly and having at least one portion thereof movable in a direction generally parallel to the axis of said half axle assembly, means pivotally connecting the adjacent ends of said links to said portion of said support member to confine such ends to movement substantially along the longitudinal axis of said half axle assembly so that relative jackknifing of said links occurs as the half axle assembly swings up and down relative to the vehicle, and each of said pivots including pivot members joined by a distortable bushing of rubber-like material.

8. In an automotive vehicle, the combination of a half axle housing with means for pivotally connecting the same at its inner end for vertical swinging movement relative to the vehicle, means interconnecting the vehicle and said half axle housing for restraining the latter against horizontal swinging movement relative to said vehicle, a half axle journaled in said housing, a power shaft located inboard of said half axle, an inboard brake operable on said power shaft, means including a universal coupling for drivingly connecting the inner end of said half axle to said power shaft, a ball and socket housing including a ball-like casing fast on the outboard end of said half axle housing and a socket-like outer member freely swiveled on said casing, a stub axle journaled in said outer member and a ground wheel received thereon, a universal joint in said casing drivingly connecting said half axle and stub axle, means for rotating said socket-like outer member about a generally upright axis to steer said wheel, a support member carried intermediate the ends of said half axle assembly and including means for permitting movement of at least a portion of said member in a direction substantially parallel to the axle axis, and an extensible duplex linkage including a first link pivotally connected to an anchorage on said vehicle and to said portion of said support member and a second link pivotally connected to said socket-like outer member and to said portion of said support member, said linkage thereby being jackknifed as an incident to vertical swing of said half axle to cant said wheel and compromise the effects of lateral wheel scrub and gyroscopic forces, said linkage also constituting means for preventing rotation of said socket-like outer member relative to said casing about the axis of said half axle.

9. In an automotive vehicle, the combination of a half axle assembly including a housing and a half axle journaled therein, means for pivoting the inner end of said half axle housing to the vehicle for relative vertical swing, a power shaft inboard of said half axle assembly on the vehicle, an inboard brake operable on said power shaft, means universally coupling said half axle to be driven by said power shaft, means interconnected between said vehicle and said half axle assembly for restraining the latter against horizontal swing relative to the vehicle, a stub axle assembly including a stub axle housing freely swiveled on the outboard end of said half axle housing and a stub axle journaled in said stub axle housing, means universally coupling said half axle and said stub axle, a ground wheel mounted on said stub axle, a support member carried intermediate the ends of said half axle housing and means for permitting at least a portion of said member to move in a direction substantially parallel to the axis of said half axle assembly, control links pivotally connected at their remote ends respectively to said vehicle and to said stub axle assembly, means pivotally connecting the adjacent ends of said control links to said part of said member to thereby cant said wheel and stub axle assembly relative to said half axle assembly upon vertical swing of the latter, said control links also preventing rotation of said stub axle assembly about the axis of said half axle assembly.

10. In an automotive vehicle, the combination of a half axle housing pivotally connected at its inner end for vertical swinging movement relative to the vehicle, means for restraining said half axle housing against horizontal swinging movement relative to said vehicle, a half axle journaled in said housing, a power shaft inboard of said half axle on the vehicle, means including a universal joint drivingly connecting said shaft and half axle, brake means operable on said power shaft, a ball and socket housing having a first part fast on the outer end of said half axle housing and a second part freely swiveled on said first part, a stub axle journaled in said second part and a ground wheel mounted thereon, a universal joint in said ball and socket housing drivingly connecting said half axle and stub axle, means for rotating said second part about a generally upright axis to steer said wheel, a medially and pivotally jointed linkage having its extremities pivotally connected about horizontal fore and aft axes respectively to the vehicle and said second part, and means connecting the joint of said linkage to the said half axle housing with freedom of such joint to shift substantially axially along said housing, said linkage thereby compensatingly canting said ground wheel as the latter is deflected on bumps, said linkage also serving to prevent rotation of said second part about the axis of said half axle without having to withstand twisting forces upon braking of the vehicle.

11. In an automotive vehicle, the combination comprising a suspension for a steerable, front traction wheel including a medially jointed axle assembly having a ground wheel on its outboard end, a pivot joint at the inboard end of said axle assembly connecting the same to the vehicle for vertical swinging movement, a power shaft inboard on the vehicle and operatively connected through said axle assembly to drive said wheel, brake means operable on said shaft, a medially and pivotally jointed linkage having its extremities pivotally connected about horizontal fore and aft axes respectively to the vehicle and the outboard portion of said axle assembly, and means connecting the joint of said linkage to the inboard portion of said axle assembly with freedom of such joint to shift substantially axially along the axle assembly, to thereby compensatingly cant said wheel as the latter is vertically deflected on bumps, said linkage being relatively light and small owing to the fact that twisting stresses are not created therein when the vehicle is braked.

References Cited in the file of this patent

UNITED STATES PATENTS

| | | |
|---|---|---|
| 1,837,106 | Bucciali | Dec. 15, 1931 |
| 2,212,453 | Perkins | Aug. 20, 1940 |
| 2,477,090 | Roeder et al. | July 26, 1949 |

FOREIGN PATENTS

| | | |
|---|---|---|
| 718,743 | France | Nov. 5, 1931 |